United States Patent [19]

Tkac et al.

[11] 4,333,822

[45] Jun. 8, 1982

[54] METHOD OF TREATING WASTE ENGINE OILS

[75] Inventors: Alexander Tkac; Ján Cvengros, both of Bratislava, Czechoslovakia

[73] Assignee: Slovenska vysoka skola technicka, Bratislava, Czechoslovakia

[21] Appl. No.: 205,269

[22] Filed: Nov. 10, 1980

[30] Foreign Application Priority Data

Nov. 10, 1979 [CS] Czechoslovakia ............... 7666-79

[51] Int. Cl.³ .................................... C10M 11/00
[52] U.S. Cl. .......................................... 208/184
[58] Field of Search .......................... 208/179, 184

[56] References Cited

U.S. PATENT DOCUMENTS

| | | | |
|---|---|---|---|
| 3,392,803 | 7/1968 | Robinson | 208/179 |
| 4,033,859 | 7/1977 | Davidson | 208/179 |
| 4,053,006 | 10/1977 | Tkac | 202/205 |
| 4,101,414 | 7/1978 | Kim | 208/184 |

Primary Examiner—T. M. Tufariello

[57] ABSTRACT

A method for the continuous decomposition of stable carbon dispersions in waste engine oils, the decomposition being immediately followed by an oil re-refining step as, preferably, a short-path distillation. In accordance with the invention, waste oil is heated, under a pressure ranging from 1 to 100 Pa, in the form of a thin film (0.1 to 2 mm thickness) to a temperature of 200°–300° C., whereby liberated vapors together with entrained microdrops condense at a temperature of 20°–100° C. Thereupon the condensate is immediately subjected to a short-path distillation to be re-refined. The entire process is advantageously effected in a single apparatus.

2 Claims, 1 Drawing Figure

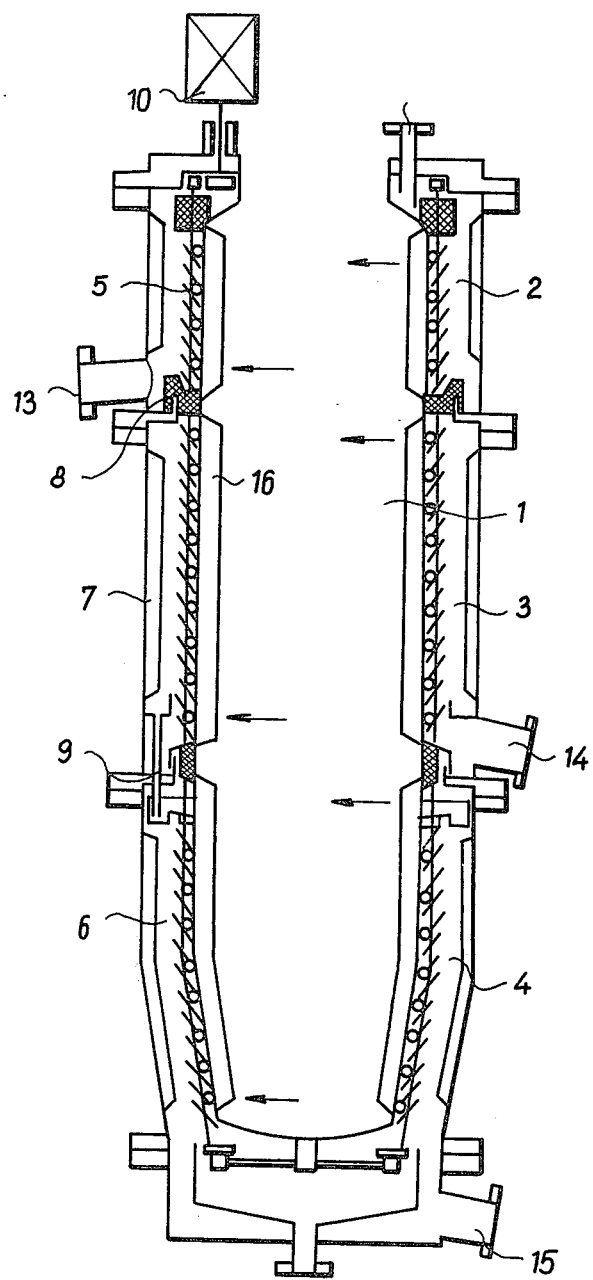

METHOD OF TREATING WASTE ENGINE OILS

This application is related to TKAC ET AL application Ser. No. 205,626, filed Nov. 10, 1980 simultaneously herewith, and to application Ser. No. 266,761, filed Jan. 22, 1981.

The invention relates to a method for the continuous decomposition of stable carbon dispersion systems in waste engine oils, the decomposition being carried out prior to the re-refining of such oils, and, preferably, being immediately followed by a short-path distillation used as the re-refining step.

Carbon as the product of incomplete fuel combustion in internal combustion engines is dispersed in waste engine oils in the form of colloidal and coarse-particle substances, and constitutes a stable colloid/suspension system which is intentionally stabilized by adding dispersing agents to fresh oil. Due to its presence, it is carbon black that considerably impairs the waste oil reclaiming and re-refining process. When applying orthodox oil reclaiming processes wherein oil is refined by means of sulphuric acid, carbon together with water residue reduces the effectiveness of the acid since stable emulsions occur. In modern oil reclaiming processes based upon distillation in vacuum rectifying columns, the carbon present negatively influences rheological characteristics of densified residues, and is responsible for a local vapor formation in short-path evaporators and consequently for mechanical spray.

In accordance with hitherto known processes of breaking oil/carbon suspensions, there have been used a plurality of chemical substances, such as desolvents and flocculents, in combination with filtering, or centrifuging. Thus, for example, there is used for this purpose water glass (Czechoslovak Pat. No. 102,753), surfactants (U.S. Pat. No. 3,985,642), inorganic salts (U.S. Pat. No. 3,529,719), lower alcohols (U.S. Pat. No. 3,835,035), substituted sulfonates (German Patent Application No. 2,507,270), and sodium in metal form (German Pat. No. 1,105,543). The aforementioned processes are disadvantageous in that oil is doped with chemical substances which are capable of negatively influencing the characteristics of the regenerate. Apart from this, they are expensive and, as a rule, time-consuming.

There are also known some physical processes of coagulating carbon in waste engine oils as, for instance, by heat effect (U.S. Pat. No. 3,923,643), electric discharge (Japanese Patent Application No. 73 17442), ultrasonic waves (Japanese Patent Application No. 73 25002), or ultrafiltration through diaphragms (German Patent Application No. 2,417,452). Disadvantages of the above processes consist in a relatively low effectiveness, expensiveness, and high demands on time.

It is an object of the present invention to eliminate the drawbacks of the prior art as hereinabove set forth, and to provide an improved method of treating waste engine oils by continuously decomposing carbon dispersion systems in waste engine oils prior to the re-refining thereof after the removal of water and easily volatile components therefrom.

In accordance with a feature of the invention, waste engine oil, after having been freed of water and easily volatile petrol and petroleum cuts, is continuously heated in the form of a thin scraped film (0.1-2 mm thickness) to a temperature of from 200° to 300° C. under a pressure of from 1 to 100 Pa whereby liberated vapors together with torn-off microdrops in aerosol form condense at a temperature of from 20° to 100° C.

The method of the present invention of destroying the unwanted dispersion character of waste oil and of separating the solid phase from the liquid one thereof does not require any chemical substances, but is based upon a combined effect of subatmospheric pressure and elevated temperature which causes, on the film surface, a vigorous development of vapors and micro-drops of a dispersion system in the form of aerosol, said vapors and micro-drops then expanding and condensing on cooled surfaces. In this way, there is disturbed an oriented stabilizing wrapper structure constituted by surfaceactive substances and oxidation products of engine oils so that a complete desorption of gases and vapors of easily volatile substances bonded to suspended particles takes place. In the process of separating solid particles from the dispersed oil phase, accompanied by a vigorous vapor and gas development, a partial infiltration of a solid phase in the form of a spray occurs into the condensate; however, the solid carbon particles or moreover other inorganic constituents, if any, have already been freed of absorbed substances and, apart from this, are present in such a low concentration that they cannot impair any more the smooth course of the actual reclaiming process such as, for example, a short-path or molecular distillation.

The main advantage of the process of pretreating waste oil according to the invention resides in that it can be carried out in a single apparatus while combining the separation of easily volatile components from the waste oil with a short-path continuous distillation.

A process of successively degasing, separating the anterior fraction, and withdrawing the product re-refinging fraction in a three-stage molecular evaporator unit in the recovery of waste engine oils as disclosed in the Czechoslovak Inventor's Certificate No. 192,284, has to cope with the problem of infiltration into the product fraction, which is especially responsible for lower color quality of the oil. This shortcoming is eliminated by the method of the invention, and the suggested combined re-refining process results in high-grade reclaimed products with high yield and without waste influencing negatively environmental conditions. Although a possibility of applying another suitable re-refining step to the material treated in the process according to the present invention is not excluded on principle, the maximum effectiveness is obtained by combining the pretreatment process with a short-path distillation in a single apparatus. The continuous decomposition of carbon dispersion in waste engine oils can, preferably, be also combined with an alkali pretreatment of waste oil before the re-refining thereof by molecular distillation in accordance with the Czechoslovakian Inventor's Certificate No. 198,671 wherein the neutralization of volatile acidic oil components and additive residues is effected by adding a small amount of an alkali liquor (0.2–0.8% by weight) whereby the acidity of the re-refined product is reduced.

An exemplary embodiment of the apparatus for performing the treatment of waste engine oils according to the invention and the immediately following re-refining thereof by short-path distillation is shown in the accompanying drawing, wherein:

The single FIGURE is a schematic view in vertical axial section through an evaporator assembly wherein the method of the invention may be carried out.

Waste engine oil freed of coarse impurities and of a substantial water content in a sedimentation tank, and continuously heated to a temperature of from 120° to 150° C., after the addition of, preferably, an aqueous alkali liquor solution in an amount of from 0.1 to 1% by weight of waste oil, is spread in the form of a thin film (0.1 to 2 mm thickness) whereupon, at a temperature of from 150° to 180° C. and under a pressure of from 500 to 10 Pa, an anterior function is separated therefrom in an amount of 3 to 20% by weight of the feed, said fraction containing remainders of free water and fuel as well as volatile components left from the engine oil decomposition. Immediately thereupon waste oil in the above-said film form is subjected to the separation of dispersed carbon and other inorganic impurities from the dispersing oil phase, which separation is carried out so that the oil film is exposed to a temperature of from 200° to 300° C. under a pressure of from 1 to 100 Pa.

Under these conditions an expansion and destruction of stabilizing wrapper structures of suspended particles as well as a vigorous oil vapor development occur. The oil phase in an amount of from 65 to 90% by weight of the feed, together with a small amount of entrained solid particles, condense as an expansion condensate on a cooling surface (having a temperature of from 20° to 100° C.) disposed at a small distance (20–50 mm) from the heating surface. A substantial portion of the suspended solid phase remains recaptured in a bituminous residue constituting from 10 to 20% by weight of the initial feed. The expansion condensate is then used in the actual re-refining process which prefereably consists in the shortpath distillation in the form of a thin scraped film (0.1 to 2 mm thickness) under a pressure of from 10 to $10^{-1}$ Pa and at a temperature of from 150° to 250° C., while the distance between the evaporator and the condenser is within the range of from 20 to 50 mm. In this manner there is obtained a distillate constituted by the re-refining original oil in an amount of from 60 to 85% by weight of the initial feed.

The following example is given as illustrative only without, however, limiting the invention to the specific details thereof.

EXAMPLE

From waste engine oil having 0.83% by weight of ash content and 2.3% by weight of carbon residue there was separated, at the temperature of 155° C. and under the pressure of 90 Pa, an anterior fraction (4% by weight) in the form of a thin scraped film (0.1–2 mm thickness). An expansion condensate which had been entrapped after the decomposition of such a dispersion system at the temperature of 270° C. and under the pressure of 30 Pa, constituted 81% by weight of the initial feed, contained 0.018% by weight of ash, 0.13% by weight of carbon residue and had color corresponding to about 8 according to ASTM. By an immediate short-path distillation of the expansion condensate at the temperature of 245° C. and under the pressure of 1 Pa there was obtained a re-refined product in the amount of 72% by weight of the initial feed, which product contained zero % ash, 0.06% by weight or carbon residue and exhibited color corresponding to 3.5 according to the ASTM standard.

The apparatus for carrying out the complete above-disclosed process according to the present invention in practice will now be described, by way of example, with reference to the afore-mentioned schematic drawing. As can be seen therein, the apparatus is constituted by an evaporator assembly 1 which is vertically disposed and comprises at a suitable height a rotary lock 8 (disclosed in Czechoslovak Inventor's Certificate No. 181,054 and U.S. Pat. No. 4,053,006) and a flow crosser 9 (disclosed in Czechoslovak Patent Application No. PV 8486-78). These two structure elements form, in the space between the evaporator assembly 1 and a battery condenser 7, three independent vacuum stages, viz. a de-aerator 2, an expansion decomposer 3, and a molecular evaporizer 4; said three elements provide their own vacuum source for the apparatus.

The evaporator assembly 1 is further provided with a sectional stripper 5 constituted, in each of the stages, by a polytetrafluoroethylene-coated system of helical segments, and driven from a single electric motor 10. The stripper 5 carries a rotary dephlagmator 6 in the form of a louver which is designed for reducing the direct infiltration. Each of the three stages of the evaporator assembly 1 is heated separately by means of a duplicator 16; the heating medium can be constituted by low-pressure steam, or a liquid heat carrier from an external source. The preheated waste oil is supplied or dosed via feed pipe 11 into the de-aerator 2 and flows down on the evaporator assembly 1 in the form of a thin scraped film produced by the stripper 5.

The condensed anterior fraction is exhausted from the apparatus through the outlet port of de-aerator 13, which part is also designed for connecting to a subatmospheric pressure source for the de-aerator 2. The non-evaporating portion continuously flows via rotary lock 8 to the expansion decomposer 3 where the separation of phases occurs. A bituminous residue together with the solid phase is exhausted from the apparatus via outlet port of an expansion decomposer 14, which port is also designed for connection to a vacuum source. The condensate from the expansion decomposer 3 continuously flows through the siphon of the flow crosser 9 onto the evaporation surface of the molecular evaporizer 4 where it is spread again into the form of thin scraped film. The distillation product from the molecular evaporizer 4 is constituted by the re-refined original oil, and is withdrawn via outlet port of another molecular evaporizer 15, which port serves as a connection to the vacuum source for the molecular evaporizer 4. The distillation residue from the molecular evaporizer 4 is recycled via pipe 12 back to the feed.

The term "Pa" means "Pascal", which is the main pressure unit comprised in the International Unit System (SI System). It is defined as the force of one newton per one square meter, and its equivalence relative to the heretofore used units are as follows:

| | |
|---|---|
| 1 atm (760 Torr) | = 101,325 Pa |
| 1 Torr | = 133.32 Pa |
| 1 p.s.i. | = 6,894.7 Pa |

Although the invention is illustrated and described with reference to one preferred embodiment therof, it is to be expressly understood that it is in no way limited to the disclosure of such a preferred embodiment, but is capable of numerous modifications within the scope of the appended claims.

We claim:

1. A method of treating waste engine oils before the re-refining thereof after the removal of water and easily volatile components therefrom, comprising heating waste engine oil under a pressure ranging from 1 to 100

Pa in the form of a thin scraped film having a thickness of from 0.1 to 2 mm to a temperature of from 200° to 300° C., condensing liberated vapors together with tornoff micro-drops at a temperature of from 20° to 100° C., and immediately subjecting the condensate to a short-path distillation whereby it is refined.

2. A method according to claim 1, wherein the waste engine oil, in order to remove water and easily volatile components therefrom, is heated to a temperature of from 120° to 150° C. under atmospheric pressure whereupon, in the form of a thin scraped film, it is finally heated to a temperature of from 150° to 180° C.

* * * * *